(12) United States Patent
Lemons

(10) Patent No.: US 7,040,492 B1
(45) Date of Patent: May 9, 2006

(54) DISPLAY ADAPTER SYSTEM

(75) Inventor: Paula Lemons, Kemersville, NC (US)

(73) Assignee: Sara Lee Corporation, Winston-Salem, NC (US)

( * ) Notice: Subject to any disclaimer, the term of this patent is extended or adjusted under 35 U.S.C. 154(b) by 85 days.

(21) Appl. No.: 10/612,206

(22) Filed: Jul. 2, 2003

(51) Int. Cl.
B42F 1/00 (2006.01)
A47F 5/00 (2006.01)

(52) U.S. Cl. .................................. 211/57.1; 211/86.01

(58) Field of Classification Search .............. 211/57.1, 211/59.1, 55, 128.1, 86.01, 189
See application file for complete search history.

(56) References Cited

U.S. PATENT DOCUMENTS

| | | | | |
|---|---|---|---|---|
| 1,620,199 | A | * | 3/1927 | Felicety .................... 211/204 |
| 2,246,692 | A | * | 6/1941 | Ohme ........................ 211/59.1 |
| 2,626,061 | A | * | 1/1953 | Girouard .................... 211/59.1 |
| 3,139,985 | A | * | 7/1964 | Sinclair ..................... 211/59.1 |
| 3,221,893 | A | * | 12/1965 | Glaberson et al. ..... 248/297.31 |
| 3,298,538 | A | | 1/1967 | Ganz et al. |
| 3,395,809 | A | * | 8/1968 | Mellion ..................... 211/59.1 |
| 3,667,826 | A | | 6/1972 | Wood et al. |
| 3,892,450 | A | * | 7/1975 | Kolster et al. .............. 312/117 |
| D256,195 | S | * | 8/1980 | Scalice ........................ D6/465 |
| 4,460,097 | A | * | 7/1984 | Darnell et al. .............. 211/189 |
| 4,586,618 | A | | 5/1986 | Norman |
| 4,905,845 | A | * | 3/1990 | Broeker et al. ................ 211/55 |
| 4,949,849 | A | | 8/1990 | Hardy |
| 5,031,783 | A | | 7/1991 | Goudreau |
| 5,085,328 | A | | 2/1992 | Evenson |
| D325,136 | S | * | 4/1992 | Lucht .......................... D6/465 |
| 5,303,830 | A | * | 4/1994 | Metcalf ...................... 211/57.1 |
| 5,595,309 | A | | 1/1997 | Bauer et al. |
| 5,772,054 | A | | 6/1998 | Potter |
| 6,029,827 | A | | 2/2000 | Valiulis |
| 6,062,399 | A | | 5/2000 | Henry et al. |
| 6,092,674 | A | | 7/2000 | Rothstein et al. |
| 6,119,875 | A | | 9/2000 | Smith |
| 6,427,853 | B1 | | 8/2002 | Brozak, Jr. |
| 6,471,079 | B1 | | 10/2002 | Berlingieri |
| 6,502,706 | B1 | | 1/2003 | Kent |
| 6,702,126 | B1 | * | 3/2004 | Park .......................... 211/59.1 |

* cited by examiner

Primary Examiner—Jennifer E. Novosad
(74) Attorney, Agent, or Firm—Kilpatrick Stockton LLP

(57) ABSTRACT

A merchandise display adapter system includes merchandise display adapter including a vertical display panel, a support leg extending transversely from the bottom of the display panel and attachable to a merchandise display fixture compartment, and a package support means attachable to the display panel for displaying a merchandise package. The merchandise display adapter has a dimension for displaying a merchandise package of a size different than the dimension of compartments in an existing display fixture. When the display panel is placed into a display fixture compartment and the support leg is attached to the compartment, the merchandise display fixture is adapted to display the merchandise package having a size different than the fixed-dimension compartments. Such a merchandise display adapter and adapter system are particularly useful for adapting a merchandise display fixture having compartments arranged in a terraced configuration.

25 Claims, 4 Drawing Sheets

DISPLAY ADAPTER SYSTEM

COPYRIGHT NOTIFICATION

A portion of the disclosure of this patent document and its attachments contain material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

FIELD OF THE INVENTION

The present invention relates to a display adapter system, and, in particular, to a system for adapting a fixed-dimension merchandise display fixture to display merchandise and/or packages having varying dimensions. Embodiments of the present invention are advantageous for providing a means for displaying hanger-type sock packages in conventional retail display fixtures designed for displaying envelope-type hosiery packages.

BACKGROUND OF THE INVENTION

As women's fashion styles change and preferences regarding hosiery move away from wearing stockings and pantyhose and toward wearing more socks, retail display space needs likewise change. Pantyhose are often packaged for sale in semi-rigid, envelope-type packages made from cardboard or other similar material. Pantyhose and stocking envelopes are typically displayed for retail viewing either by hanging on a hanger assembly or by standing upright in a hosiery display cabinet. A conventional retail hosiery display cabinet, or fixture, for displaying envelope-type hosiery packages in a standing position includes a display rack having a plurality of rows of compartments oriented in a stair-step, or terraced, fashion.

Hosiery such as socks or knee-high sheer hosiery, for example, are typically packaged in smaller-sized packages than pantyhose and would not be viewable by customers if placed directly in the terraced compartments of a conventional pantyhose display cabinet. In addition, socks are generally packaged for display on a hanger and do not have sufficient product or package rigidity to support the socks in an upright position for organized and convenient retail viewing.

The display portion of such a conventional retail fixture has built-in, or fixed, dimensions for receiving merchandise packages for display. The fixed dimensions restrict the use of such display fixtures to packages whose sizes will fit into the display compartments, or pockets, formed in the display portion of the fixtures. Consequently, the amount of display space that can be utilized in such a fixture for merchandise packages having different sizes is limited.

To accommodate display of packages having sizes for which a display fixture is not intended, the fixture must be modified. Such display fixture modifications often require significant capital expenditures, time, and lost retail display space during modifications to alter the display dimensions. In certain situations, accommodation of retail display space for merchandise packages having various dimensions requires complete disassembly and/or removal of a display fixture and replacement with a fixture having the desired dimensions and configuration.

Some conventional merchandise display unit constructions incorporate various means for adjusting space for displaying merchandise items. For example, U.S. Pat. No. 3,667,826 to Wood et al. discloses a slotted frame which can be quickly assembled and dissembled, to which shelves can be attached at varied levels. The '826 patent also discloses a plurality of vertically-spaced bars attachable at different levels on the frame for receiving a merchandise display member, such as a hook. Such systems allow for displaying merchandise of variable heights but do not allow a pre-existing display unit without such a slotted frame to be adapted for packages having varying dimensions.

Another approach to adapting a display system for varying sized items is disclosed in U.S. Pat. No. 5,085,328 to Evenson. The '328 patent discloses a brochure display system including a plurality of interconnectable brochure pockets and variable height brochure support shelves that interconnect with the brochure pockets via notches in the back wall of the pockets. The support shelves can be moved up or down to allow the top edges of brochures having varying heights to be displayed at the same level. A disadvantage of such an approach for adapting a display unit is that the display unit must be configured with notches at the time of manufacture so that support shelves can be moved up or down to accommodate for items having varying heights.

Other conventional merchandise storage/display systems are disclosed in U.S. Pat. No. 4,586,618 to Norman and U.S. Pat. No. 5,031,783 to Goudreau. The '618 patent discloses a wire grid mounted on a wire frame and a means for supporting containers for storing and/or displaying goods on the wire grid. The means for supporting the containers can include a hook member, such as a flange, spaced from and extending downwardly from the rear of the container for hooking the container onto the wire grid. In another construction, the means for supporting the containers includes a hook-like member adapted to bear on one side of the grid and a means for supporting the goods on the opposite side of the grid.

The '783 patent discloses a wire rack comprising horizontal wires and a means for attaching the horizontal wires to a vertical support means so that the horizontal wires are movable up and down the length of the vertical support means. Support elements such as brackets can be attached to and extend from the horizontal wires to support merchandise for display. The bracket can be moved laterally along the length of the horizontal wires. A disadvantage of these display systems is that the wire racks and/or the merchandise support means must themselves be adjusted to allow for display of packages having varying dimensions, and, as such, are not particularly suited for quickly, easily, or attractively adapting a fixed-dimension display fixture to accommodate such variable-sized packages.

The problem of fixed-dimension display space has been addressed in one approach to adjusting a terraced greeting card display. U.S. Pat. No. 4,949,849 to Hardy, for example, discloses a greeting card display assembly that includes a plurality of pocket-forming members having transversely extending members forming the back, bottom, and front walls of half pockets formed in a stepped relationship. The display assembly of stepped half pockets is attached to a supporting structure. Vertically oriented dividers are placed at desired locations along the width of the transversely extending members so as to accommodate greeting cards of different widths. While this approach accommodates merchandise of different sizes within a terraced rack, such a display structure is suitable only for merchandise and/or merchandise packages having sufficient rigidity to stand upright for retail viewing, for example, an envelope-type hosiery package.

Thus, there is a need for a system for readily adapting a pre-existing, terraced display fixture to display merchandise packages having varying dimensions. There is a need for such a convenient and cost-effective system to readily adapt a retail display fixture to display merchandise packaged in both envelope and hanger style packages having varying dimensions.

SUMMARY OF THE INVENTION

The present invention provides a merchandise display adapter system useful for adapting a merchandise display fixture having compartments with fixed dimensions to display merchandise packages having sizes different than the fixed-dimension compartments. Embodiments of the present invention are particularly useful for adapting a merchandise display fixture having compartments arranged in a terraced, or stepped, configuration. Embodiments of the display adapter system include a vertical display panel having a top, a bottom, and two sides, and the display panel has a dimension for displaying a merchandise package having a size different than the dimension of the compartments. A support leg extends transversely from the bottom of the display panel and is capable of supporting the display panel in an upright position. The support leg is removably attachable to a horizontal surface in the merchandise display fixture compartments. The display adapter system includes a package support means attachable to the display panel for displaying a merchandise package. When the display panel is placed into a display fixture compartment and the support leg is attached to the compartment, the merchandise display fixture is adapted to display the merchandise package having a size different than the fixed-dimension compartments.

In embodiments of the present invention, a merchandise display adapter system includes a support leg extension member having a width less than the width of the display panel that extends downwardly from and in the same plane as the display panel. The support leg extension member has a height greater than a height of a divider between the display fixture compartments, allowing the display panel to span across multiple fixed-dimension compartments. The support leg extends transversely from the support leg extension member and is attachable to a horizontal surface in the compartment. In this manner, the display adapter system provides a means to display merchandise packages in the display fixture wider than permissible in the individual fixed-dimension compartments. In other embodiments, the display panel includes two or more spaced-apart support legs that are capable of being placed into compartments between dividers in a display fixture.

The support leg(s) can be attached to the merchandise display fixture compartment using various fastening means, including, for example, a hook-and-loop type fastener and a screw.

In embodiments of a display adapter system of the present invention, the vertical display panel preferably comprises a rigid display panel that will stand upright. The display panel and the support leg can be made from acrylic, wood, metal, corrugated paper, and/or other material suitable for providing a rigid display adapter. In addition to attaching the support leg(s) to a display fixture compartment, the vertical display panel can be removably attached to a vertical surface of the display fixture by connecting a hook-and-loop type fastener, screw, or other suitable fastener to the back of the display panel and to a vertical surface in a fixture compartment.

In embodiments of the present invention, the package support means includes a package support arm and a bracket attached to the package support arm for connecting the package support arm to the display panel. The package support arm and bracket are attachable to the display panel and are adjustable along the width of the display panel in a variety of ways, depending on the configuration of the display panel, package support arm, and/or bracket. For example, in one embodiment, the package support arm has an inverted U-shape configuration, or clip, on one end defining a downwardly opening slot adapted to fit over the top edge of the vertical display panel. In such a configuration, the bracket is adapted to slidingly fit over the top of the display panel for adjusting the position of the package support arm laterally from one side to the other side along the top of the display panel. In this manner, the merchandise display fixture is adapted to display merchandise packages having varying widths.

In another embodiment, the display panel comprises a J-shaped channel disposed from one side to the other side adjacent to the top of the display panel. The bracket is adapted to slidingly fit into the J-shaped channel for adjusting the position of the package support arm laterally along the channel. The merchandise display fixture is thusly adapted to display merchandise packages having varying widths.

In another embodiment, the display panel includes a plurality of spaced-apart bracket-receiving slots adjacent the top of the display panel. The bracket has a flange extending upwardly from the bracket and offset from the plane of the bracket in an "S-shaped" configuration, such that the flange is capable of being inserted upwardly into one of the plurality of bracket-receiving slots in the display panel. By attaching the bracket and package support arm to selected bracket-receiving slots, the merchandise display fixture can be adapted to display merchandise packages having varying widths.

The package support arm can be adapted to receive merchandise packages having a hanging means. Accordingly, merchandise packages of various types having a hook, aperture, or other means for hanging, including envelope style packages, box type packages, and wrap-around display packages, can be displayed on a display panel of the present invention.

A merchandise display adapter system of the present invention can be utilized in merchandise display fixtures of various types and that are designed for displaying different types of merchandise. For example, the merchandise display fixture can be a fixture for displaying hosiery and hosiery packages. Embodiments of the present invention can also be used with display fixtures designed to display greeting cards, snack foods, small toys, and other items suitable for retail display in such a display fixture.

In such a merchandise display adapter system, a plurality of display panels having varying heights can be utilized in a single display fixture. As such, the merchandise display fixture is adapted to display merchandise packages having varying heights. In some applications, a display adapter of the present invention is placed in only a portion of the display fixture compartments, such as in alternating rows of compartments, to adapt a selected portion of the display fixture for displaying varying sizes of merchandise. In other applications, the display adapter is placed in each of the display fixture compartments to adapt the entire display fixture for displaying merchandise having sizes that vary from the fixed-dimension compartments.

The present invention includes embodiments of a merchandise display adapter for adapting a terraced merchandise display fixture having fixed size compartments to display merchandise packages having varying sizes. The display adapter include a vertical display panel having a top, a bottom, and two sides, and a display area size different than the fixed size of the compartments. A support leg extends transversely from the bottom of the display panel and is capable of supporting the display panel in an upright position. The support leg is removably attachable to a horizontal surface in the merchandise display fixture compartments. The display adapter includes a package support means attachable to the display panel for displaying a merchandise package. When the display panel is placed into a display fixture compartment and the support leg is attached to the compartment, the merchandise display fixture is adapted to display the merchandise package having a size different than the fixed-dimension compartments.

In embodiments of the present invention, a merchandise display adapter includes a support leg extension member having a width less than the width of the display panel that extends downwardly from and in the same plane as the display panel. The support leg extension member has a height greater than a height of a divider between the display fixture compartments, allowing the display panel to span across multiple fixed-dimension compartments. The support leg extends transversely from the support leg extension member and is attachable to a horizontal surface in the compartment. In this manner, the display adapter system provides a means to display merchandise packages in the display fixture wider than permissible in the individual fixed-dimension compartments. In other embodiments, the display panel includes two or more spaced-apart support legs that are capable of being placed into compartments between dividers in a display fixture.

By utilizing an embodiment of the vertical display panel, package support arm, and bracket described herein, a merchandise display adapter of the present invention can be used to adapted a fixed-dimension merchandise display fixture to display merchandise packages having varying widths. A plurality of merchandise display adapters of the present invention can be utilized together in a single display fixture. The display adapters can have a display panel with varying heights, which, when used together, effectively adapts a display fixture to display merchandise packages having varying heights.

A merchandise display adapter of the present invention can be utilized in merchandise display fixtures of various types and that are designed for displaying different types of merchandise, such as in a display fixture for displaying hosiery and hosiery packages. Embodiments of the display adapter can also be used with display fixtures designed to display greeting cards, snack foods, small toys, and other items suitable for retail display in such a display fixture.

The present invention includes embodiments of a method for adapting a terraced merchandise display fixture having a plurality of fixed size compartments to display merchandise packages having varying sizes. Such a method includes providing a merchandise display adapter comprising a vertical display panel having a top, a bottom, and two sides, the vertical display panel having a display area size different than the fixed size of the compartments. The display adapter also includes a support leg extending transversely from the bottom of the display panel that is capable of supporting the display panel in an upright position. The support leg is removably attachable to a horizontal surface in the merchandise display fixture compartments. The display adapter further includes a package support means for displaying a merchandise package, which is attachable to the display panel. The display panel is placed in at least one display fixture compartment, and the support leg is attached to the compartment.

Such a method of the present invention can further include placing the display panels in alternating rows of the compartments such that alternating rows are adapted to display merchandise packages having varying sizes. In another embodiment, the display panels are placed in each row of the compartments such that each row is adapted to display merchandise packages having varying sizes.

In embodiments of a method of the present invention, a merchandise display adapter includes a support leg extension member having a width less than the width of the display panel that extends downwardly from and in the same plane as the display panel. The support leg extension member has a height greater than a height of a divider between the display fixture compartments, allowing the display panel to span across multiple fixed-dimension compartments. The support leg extends transversely from the support leg extension member and is attachable to a horizontal surface in the compartment. In this manner, the display adapter system provides a means to display merchandise packages in the display fixture wider than permissible in the individual fixed-dimension compartments. In embodiments, the display panel includes two or more spaced-apart support legs that are capable of being placed into compartments between dividers in a display fixture.

In embodiments of a method, utilizing an embodiment of the vertical display panel, package support arm, and bracket described herein will adapt a fixed-dimension merchandise display fixture to display merchandise packages having varying widths. A plurality of merchandise display adapters of the present invention can be utilized together in a single display fixture. The display adapters can have a display panel with varying heights, which, when used together, effectively adapts a display fixture to display merchandise packages having varying heights.

In a method of the present invention, a merchandise display adapter of the present invention can be utilized in merchandise display fixtures of various types and that are designed for displaying different types of merchandise, such as in a display fixture for displaying hosiery and hosiery packages.

Features of a display adapter system of the present invention may be accomplished singularly, or in combination, in one or more of the embodiments of the present invention. As will be appreciated by those of ordinary skill in the art, the present invention has wide utility in a number of applications as illustrated by the variety of features and advantages discussed below.

A display adapter system of the present invention provides numerous advantages over prior merchandise display systems. For example, the present invention advantageously allows a pre-existing merchandise display fixture to be adapted to display merchandise packages having dimensions for which the original display fixture was not configured. As such, a merchandise display adapter system of the present invention increases the flexibility of retail space utilization for displaying merchandise items in pre-existing merchandise display fixtures.

Another advantage is that the present invention avoids the need for structural reconfiguring of a merchandise display fixture, such as adding and/or moving vertical dividers and/or mounting a pegboard, in order to accommodate display of merchandise packages for which the display fixture is not designed. Accordingly, the costs of material, labor, and lost retail display time involved in such structural reconfiguring of a display fixture are avoided.

Another advantage is that the present invention provides a merchandise display adapter system that allows display in a display fixture of merchandise packages having various widths and heights. For example, embodiments of the present invention provide a merchandise package support means that can be readily spaced or moved laterally along the horizontal width of a display panel so as to provide space for packages of differing widths. In embodiments, a display panel is made of varying heights so as to provide space for packages of differing heights.

Another advantage is that the present invention provides a merchandise display adapter system that allows merchandise packages of an envelope or boxed style to be displayed along with packages displayed on a hanger in the same merchandise display fixture without having to re-configure the fixed structures of the display fixture.

Another advantage is that the present invention provides a merchandise display adapter system that allows for the adaptation of a portion of a display area, or an entire display area, of a merchandise display fixture.

Still another advantage is that the present invention provides a merchandise display adapter that is readily movable for use in different retail display fixtures as the need arises, and that is efficiently storable by nesting multiple display adapters together.

Still another advantage is that the present invention provides a merchandise display system that can be used with permanently fixed retail display structures and/or with display structures that are portable.

Yet another advantage is that the present invention is inexpensive to manufacture and can be used without difficulty. For example, embodiments of such a display adapter system can be utilized to retrofit an existing display fixture without the use of tools.

Yet another advantage is that the present invention provides a display adapter system that is attractive, functions to maintain as large an inventory of merchandise on the sales floor as possible, and promotes the sale of merchandise.

As will be realized by those of skill in the art, many different embodiments of a display adapter system according to the present invention are possible. Additional uses, objects, advantages, and novel features of the invention are set forth in the detailed description that follows and will become more apparent to those skilled in the art upon examination of the following or by practice of the invention.

DETAILED DESCRIPTION

Embodiments of a merchandise display adapter system of the present invention are useful for adapting a merchandise display fixture having compartments with fixed dimensions to display merchandise packages having sizes different than the fixed-dimension compartments. FIGS. 1–4 show such embodiments.

Figure 1:
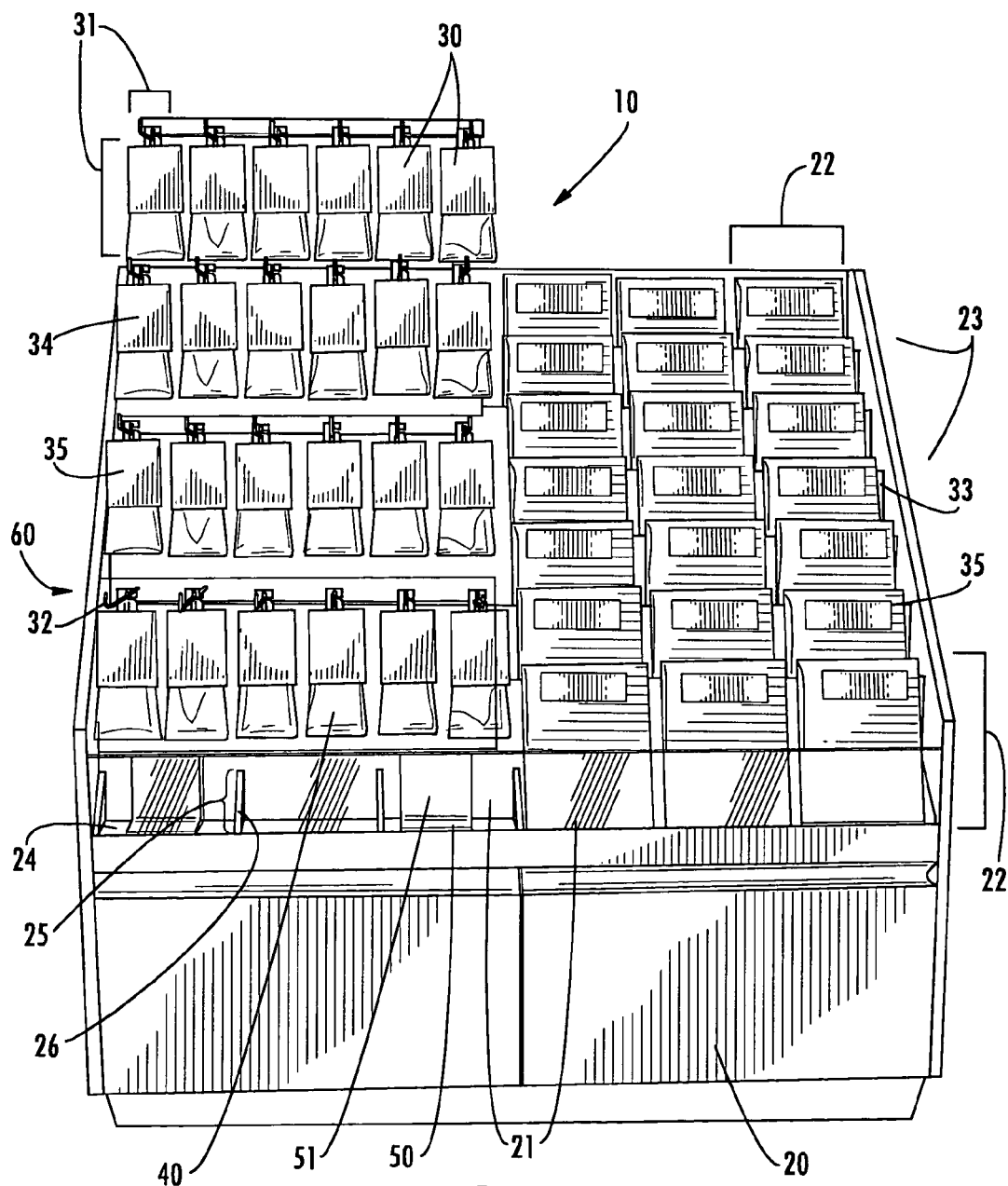
FIG. 1 is a view of a merchandise display adapter system in an embodiment of the present invention.
Figure 2:
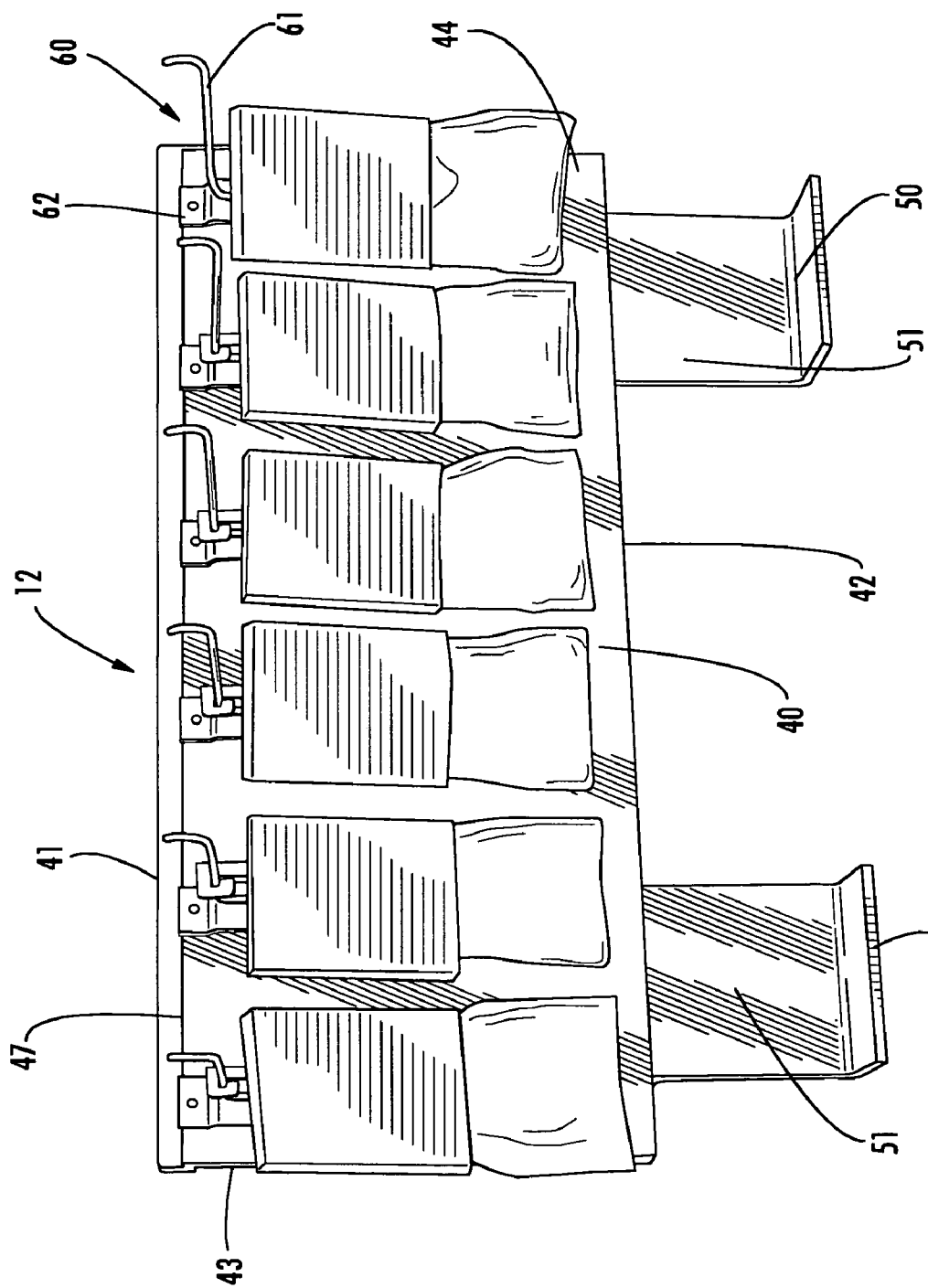
FIG. 2 is a view of a merchandise display adapter shown displaying merchandise packages in an embodiment of the present invention.

As shown in FIGS. 1 and 2, embodiments of the present invention are particularly useful for adapting a merchandise display fixture 20 having compartments 21 arranged in a terraced, or stepped, configuration 23. A display adapter system 10 includes a vertical display panel 40 having a top 41, a bottom 42, and two sides 43, 44. The display panel 40 has a dimension 45 for displaying a merchandise package 30 having a size 31 different than a fixed dimension 22 of the compartments 21. Two spaced-apart support legs 50 extend transversely from the bottom 42 of the display panel 40 and are capable of supporting the display panel 40 in an upright position. The support leg 50 is removably attachable to a horizontal surface 24 in the merchandise display fixture compartments 21. A package support means 60 is attachable to the display panel 40 for displaying a merchandise package 30. When the display panel 40 is placed into a display fixture compartment 21 and the support leg 50 is attached to the compartment 21, the merchandise display fixture 20 is adapted to display the merchandise package 30 having a size 31 different than the fixed-dimension compartments 21.

The merchandise display adapter system 10 includes a support leg extension member 51 near each side 43, 44 of the display panel 40 that extend downwardly from and in the same plane as the display panel 40. The support leg extension members 51 have a width 52 less than the width 46 of the display panel 40. The support leg extension members 51 have a height 53 greater than a height 25 of a divider 26 between the display fixture compartments 21, allowing the display panel 40 to span across multiple fixed-dimension compartments 21. The support legs 50 extend transversely from the support leg extension members 51 and are attachable to the horizontal surface 24 in the compartments 21. In this manner, the display adapter system 10 provides a means to accommodate merchandise packages 30 of varying widths and heights unrestricted by the fixed dimension 22 of the display fixture compartments 21.

The support legs 50 can be attached to the merchandise display fixture compartments 21 using various fastening means, including, for example, a hook-and-loop type fastener and/or a screw.

In preferred embodiments, the display panel 40 has a strength and/or thickness sufficient to provide rigidity to the display panel 40 so that the display panel 40 will stand upright. The display panel 40, the support legs 50, and the support leg extension members 51 can be made from acrylic, wood, metal, corrugated paper, and/or other material suitable for providing a rigid display adapter. In addition to attaching the support legs 50 to the display fixture compartments 21, the vertical display panel 40 can be removably attached to a vertical surface of the merchandise display fixture 20 by connecting a hook-and-loop type fastener, screw, or other suitable fastener to the back of the display panel 40 and to a vertical surface in the display fixture compartment 21.

Figure 4:
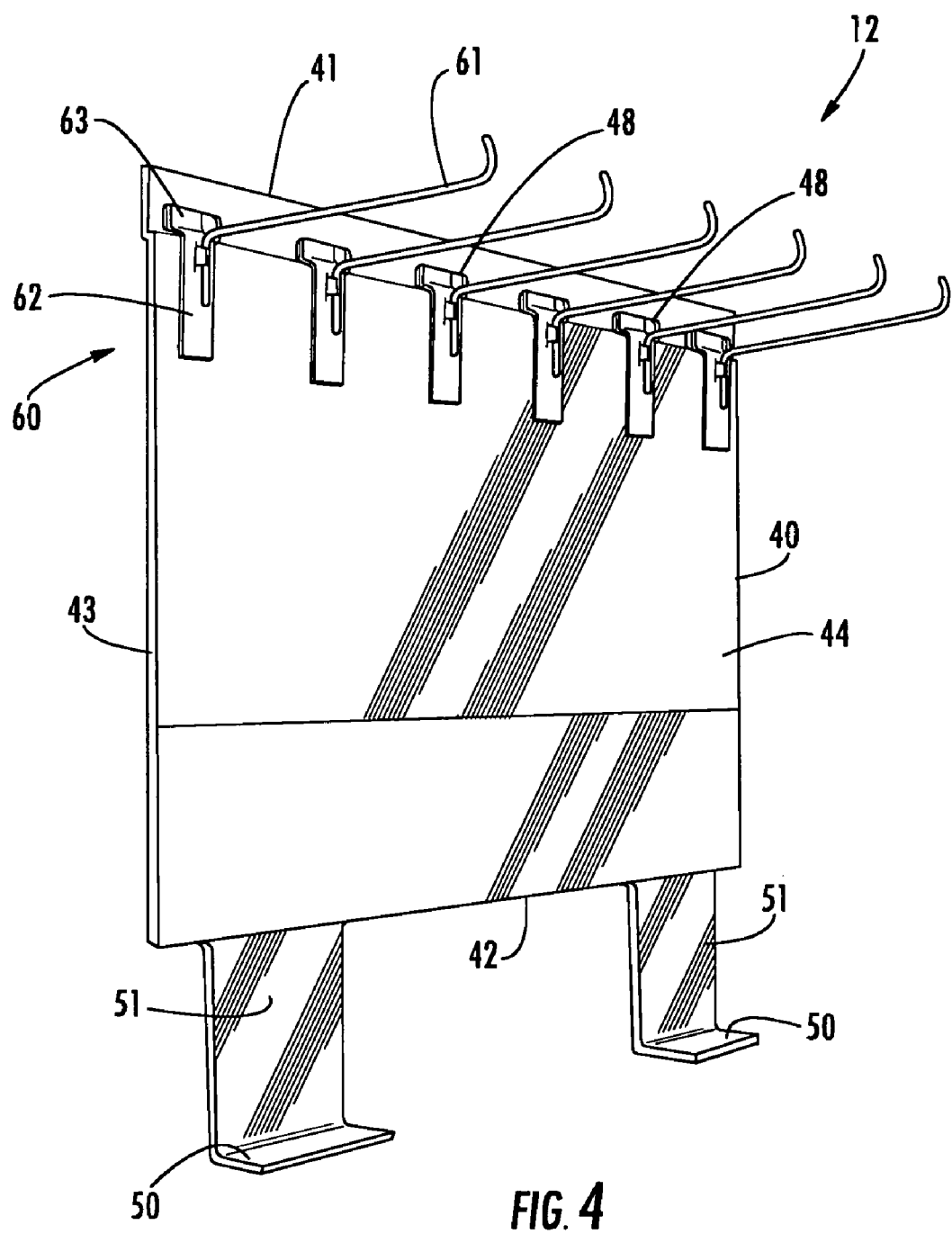
FIG. 4 is a view of the merchandise display adapter shown in FIG. 3 showing a package support means in an embodiment of the present invention.

As shown in FIGS. 1, 2, and 4, the package support means 60 of the merchandise display adapter 12 includes a package support arm 61 and a bracket 62 attached to the package support arm 61 for connecting the package support arm 61 to the display panel 40. The package support arm 61 and bracket 62 are attachable to the display panel 40 and are adjustable along the width 46 of the display panel 40 in a variety of ways, depending on the configuration of the display panel 40, package support arm 61, and/or bracket 62. For example, in one embodiment (not shown) the package support arm 61 has an inverted U-shape configuration, or clip, on one end defining a downwardly opening slot adapted to fit over the top 41 edge of the vertical display panel 40. In such a configuration, the bracket 62 is adapted to slidingly fit over the top 41 of the display panel 40 for adjusting the position of the package support arm 61 laterally from one side 43 to the other side 44 along the top 41 of the display panel 40. In this manner, the merchandise display fixture 20 is adapted to display merchandise packages 30 having varying widths. In embodiments of the present invention, the display panels 40 can have different heights to allow for display of merchandise packages 30 having different heights.

As shown in the embodiments in FIGS. 1 and 2, the display panel 40 comprises a J-shaped channel 47 disposed from one side 43 to the other side 44 adjacent to the top 41 of the display panel 40. The bracket 62 is adapted to slidingly fit into the J-shaped channel 47 for adjusting the position of the package support arm 61 laterally along the channel 47. The merchandise display fixture 20 is thusly adapted to display merchandise packages 30 having varying widths.

In the embodiment shown in FIG. 4, the display panel 40 includes a plurality of spaced-apart bracket-receiving slots 48 adjacent the top 41 of the display panel 40. The bracket 62 has a flange 63 extending upwardly from the bracket 62 and offset from the plane of the bracket 62 in an "S-shaped" configuration, such that the flange 63 is capable of being inserted upwardly into one of the plurality of bracket-receiving slots 48 in the display panel 40. By attaching the bracket 62 and package support arm 61 to selected bracket-receiving slots 48, the merchandise display fixture 20 can be adapted to display merchandise packages 30 having varying widths.

In embodiments of the present invention, the package support means 60 can be other types of a supporting element, for example, a hook or peg, which can be attached to and extend from the vertical display panel 40 to support merchandise packages 30 for display.

The package support arm 61 shown in FIGS. 1, 2, and 4 is adapted to receive merchandise packages 30 having a hanging means 32. Accordingly, merchandise packages of various types having a hook, aperture, or other means for hanging, including envelope style packages 33, box type packages (not shown), and wrap-around display packages 34, can be displayed on a display panel 40 of the present invention.

A merchandise display adapter system 10 of the present invention can be utilized in merchandise display fixtures 20 of various types and that are designed for displaying different types of merchandise. For example, the merchandise display fixture 20 can be a fixture for displaying hosiery and hosiery packages 35, as shown in FIG. 1. Embodiments of the present invention can also be used with display fixtures designed to display greeting cards, snack foods, small toys, and other items suitable for retail display in such a display fixture.

In a merchandise display adapter system 10, a plurality of display panels 40 having varying heights can be utilized in a single display fixture 20. As such, the merchandise display fixture 20 is adapted to display merchandise packages 30 having varying heights. In some applications, a display adapter 12 of the present invention is placed in only a portion of the display fixture compartments 21, such as in alternating rows of compartments 21, to adapt a selected portion of the display fixture 20 for displaying varying sizes of merchandise packages 30. For example, as shown in FIG. 1, in the merchandise display fixture 20 having a terraced configuration 23 of compartments 21, a display adapter 12 is placed in each of four alternating rows on half of the display fixture 20 to provide a combination display of non-hanging envelope style packages 33 for pantyhose and hanging wrap-around display packages 34 for socks. In other applications, the display adapter 12 is placed in each of the display fixture compartments 21 to adapt the entire display fixture 20 for displaying merchandise packages 30 having sizes that vary from the fixed-dimension compartments 21.

Figure 3:
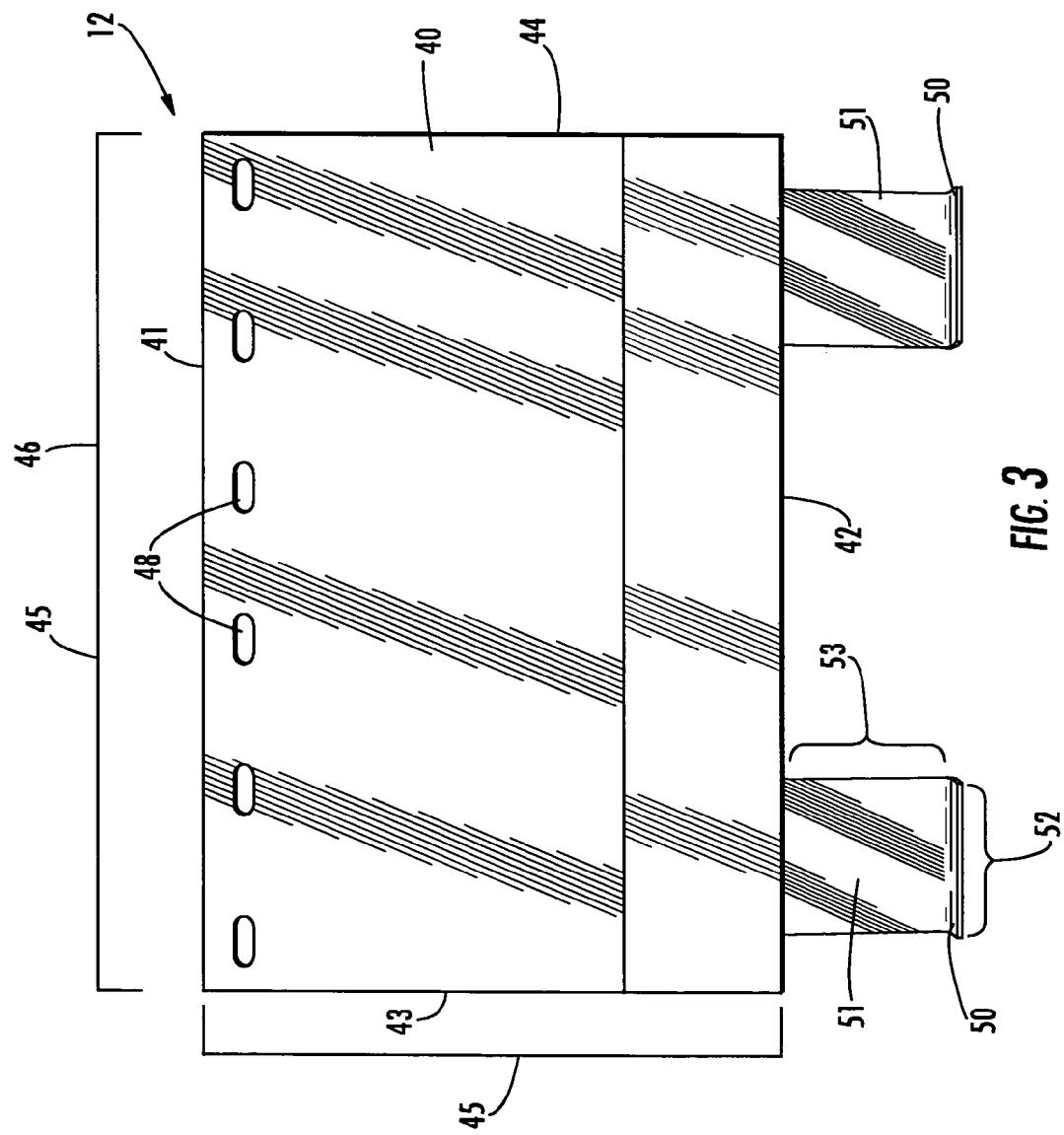
FIG. 3 is a view of a merchandise display adapter in another embodiment of the present invention.

As shown in FIGS. 2, 3, and 4, the present invention includes embodiments of a merchandise display adapter 12 for adapting a terraced merchandise display fixture 20 having fixed size compartments 21 to display merchandise packages 30 having varying sizes 31. The display adapter 12 includes a vertical display panel 40 having a top 41, a bottom 42, and two sides 43, 44, and a display area size different than the fixed size 22 of the compartments 21. A pair of support leg 50 extend transversely from the bottom 42 of the display panel 40 and are capable of supporting the display panel 40 in an upright position. The support legs 50 are removably attachable to a horizontal surface 24 in the merchandise display fixture compartments 21. The display adapter 12 includes a package support means 60 attachable to the display panel 40 for displaying a merchandise package 30. When the display panel 40 is placed into a display fixture compartment 21 and the support legs 50 are attached to the compartment 21, the merchandise display fixture 20 is adapted to display the merchandise package 30 having a size 31 different than the fixed-dimension 22 of the compartments 21.

The merchandise display adapter 12 includes a pair of support leg extension members 51 that extend downwardly from and in the same plane as the display panel 40 and that have a width 52 less than the width 46 of the display panel 40. The support leg extension members 51 have a height 53 greater than the height 25 of the dividers 26 between the display fixture compartments 21, allowing the display panel 40 to span across multiple fixed-dimension compartments 21. The pair of support legs 50 extends transversely from the support leg extension members 51. In this manner, the display adapter 12 provides a means to display merchandise packages 30 in the display fixture 20 wider than permissible in the individual fixed-dimension compartments 21.

By utilizing an embodiment of the vertical display panel 40, package support arm 61, and bracket 62 described herein, the merchandise display adapter 12 can be used to adapted a fixed-dimension merchandise display fixture 20 to display merchandise packages 30 having varying widths. A plurality of merchandise display adapters 12 can be utilized together in a single display fixture. The display adapters 12 can have a display panel 40 with varying heights, which, when used together, effectively adapts a display fixture 20 to display merchandise packages 30 having varying heights.

The merchandise display adapter 12 can be utilized in merchandise display fixtures 20 of various types and that are designed for displaying different types of merchandise, such as in a display fixture 20 for displaying hosiery and hosiery packages 35. Embodiments of the display adapter 12 can also be used with display fixtures designed to display greeting cards, snack foods, small toys, and other items suitable for retail display in such a display fixture.

The present invention includes embodiments of a method for adapting a terraced merchandise display fixture 20 having a plurality of fixed size compartments 21 to display merchandise packages 30 having varying sizes. Such a method includes providing a merchandise display adapter 12 comprising a vertical display panel 40 having a top 41, a bottom 42, and two sides 43, 44. The display panel 40 has a display area size different than the fixed size 22 of the compartments 21. The display adapter 40 also includes a support leg 50 extending transversely from the bottom 42 of the display panel 40 that is capable of supporting the display panel in an upright position. The support leg 50 is removably attachable to a horizontal surface 24 in the merchandise display fixture compartments 21. The display adapter 12 further includes a package support means 60 for displaying a merchandise package 30, which is attachable to the display panel 40. The display panel 12 is placed in at least one display fixture compartment 21, and the support leg 50 is attached to the compartment 21.

The method can include placing the display panels 40 in alternating rows of the compartments 21 such that alternating rows are adapted to display merchandise packages 30 having varying sizes. In another embodiment, the display panels 40 are placed in each row of the compartments 21 such that each row is adapted to display merchandise packages 30 having varying sizes.

In such a method, a merchandise display adapter 12 includes a support leg extension member 51 having a width 52 less than the width 46 of the display panel 40 that extends downwardly from and in the same plane as the display panel. The support leg extension member 51 has a height 52 greater than the height 25 of a divider 26 between the display fixture compartments 21, allowing the display panel 40 to span across multiple fixed-dimension compartments 21. The support leg 50 extends transversely from the support leg extension member 51 and is attachable to a horizontal surface 24 in the compartment 21. In this manner, the display adapter system 10 provides a means to display merchandise packages 30 in the display fixture 20 wider than permissible in the individual fixed-dimension compartments 21. As shown in FIGS. 1–4, the display panel 40 can include two or more spaced-apart support legs 50 that are capable of being placed into compartments 21 between dividers 26 in a display fixture 20.

In embodiments of a method, utilizing an embodiment of the vertical display panel 40, package support arm 61, and bracket 62 described herein will adapt a fixed-dimension 22 merchandise display fixture 20 to display merchandise packages 30 having varying widths. A plurality of merchandise display adapters 12 can be utilized together in a single display fixture 20. The display adapters 12 can have a display panel 40 with varying heights, which, when used together, effectively adapts a display fixture 20 to display merchandise packages 30 having varying heights.

In a method of the present invention, a merchandise display adapter 12 of the present invention can be utilized in merchandise display fixtures 20 of various types and that are designed for displaying different types of merchandise, such as in a display fixture 20 for displaying hosiery and hosiery packages 35.

Although the present invention has been described with reference to particular embodiments, it should be recognized that these embodiments are merely illustrative of the principles of the present invention. Those of ordinary skill in the art will appreciate that a display adapter system of the present invention may be constructed and implemented in other ways and embodiments. Accordingly, the description herein should not be read as limiting the present invention, as other embodiments also fall within the scope of the present invention.

What is claimed is:

1. A merchandise display adapter system, comprising:
    a merchandise display fixture comprising a plurality of compartments, each compartment having a first dimension for displaying a merchandise package having a first size;
    a vertical display panel having a top, a bottom, and two sides, the vertical display panel having a second dimension for displaying a merchandise package having a second size;
    a support leg extending transversely from the bottom of the display panel and capable of supporting the display panel in an upright position, the support leg removably attachable to a horizontal surface in at least one of the plurality of merchandise display fixture compartments; and
    a package support means for displaying a merchandise package, the package support means attachable to the display panel,
    wherein when the support leg is attached to the at least one merchandise display fixture compartment, the merchandise display fixture is adapted to display the merchandise package having the second size.

2. The merchandise display adapter system of claim 1, wherein the plurality of compartments comprises a terraced arrangement in the merchandise display fixture.

3. The merchandise display adapter system of claim 1, wherein the vertical display panel further comprises a rigid display panel.

4. The merchandise display adapter system of claim 1, wherein the vertical display panel is removably attachable to a vertical surface of the merchandise display fixture.

5. The merchandise display adapter system of claim 1, the display panel having a width,
    wherein a support leg extension member having a width less than the width of the display panel extends downwardly from and in the same plane as the vertical display panel,
    wherein the support leg extends transversely from the support leg extension member, and
    wherein the support leg extension member has a height greater than a height of a divider between the display fixture compartments.

6. The merchandise display adapter system of claim 5, wherein the support leg further comprises at least two spaced-apart support legs.

7. The merchandise display adapter system of claim 1, wherein a portion of the plurality of compartments of the merchandise display fixture is adapted to display the merchandise package having the second size.

8. The merchandise display adapter system of claim 1, wherein each of the plurality of compartments of the merchandise display fixture is adapted to display the merchandise package having the second size.

9. The merchandise display adapter system of claim 1, wherein the package support means further comprises a package support arm and a bracket attached to the package support arm for connecting the package support arm to the display panel.

10. The merchandise display adapter system of claim 9, wherein the display panel further comprises a plurality of spaced-apart bracket-receiving slots adjacent the top of the display panel, and wherein the bracket further comprises a flange extending upwardly from the bracket and offset from the plane of the bracket in an "S-shaped" configuration, such that the flange is capable of being inserted upwardly into one of the plurality of bracket-receiving slots in the display panel.

11. The merchandise display adapter system of claim 9, wherein the package support arm is adapted to receive merchandise packages having a hanging means.

12. The merchandise display adapter system of claim 9, wherein the display panel further comprises a J-shaped channel disposed from one side to the other side adjacent to the top of the display panel and wherein the bracket is adapted to slidingly fit into the J-shaped channel for adjusting the position of the package support arm laterally along the channel to adapt the merchandise display fixture to display merchandise packages having varying widths.

13. The merchandise display adapter system of claim 1, wherein the display panel and the support leg comprise acrylic, wood, metal, or corrugated paper.

14. The merchandise display adapter system of claim 1, wherein the merchandise display fixture comprises a fixture for displaying hosiery and the merchandise package comprises a hosiery package.

15. A merchandise display adapter for adapting a terraced merchandise display fixture having fixed size compartments to display merchandise packages having varying sizes, comprising:
    a vertical display panel having a top a bottom, and two sides, the vertical display panel having a display area size different than the fixed size of the compartments;
    a support leg extending transversely from the bottom of the display panel and capable of supporting the display panel in an upright position the support leg removably attachable to a horizontal surface in the merchandise display fixture compartments; and
    a package support means for displaying a merchandise package, the package support means attachable to the display panel and having a package support arm and a bracket attached to the package support arm for connecting the package support arm to the display panel,
    wherein the display panel further comprises a J-shaped channel disposed from one side to the other side adjacent to the top of the display panel and wherein the bracket is adapted to slidingly fit into the J-shaped channel for adjusting the position of the package support arm laterally along the channel to adapt the merchandise display fixture to display merchandise packages having varying widths.

16. A method for adapting a terraced merchandise display fixture comprising a plurality of fixed size compartments to display merchandise packages having varying sizes, comprising:
    providing a merchandise display adapter comprising a vertical display panel having a top, a bottom, and two sides, the vertical display panel having a display area size different than the fixed size of the compartments, a support leg extending transversely from the bottom of the display panel and capable of supporting the display panel in an upright position, the support leg removably attachable to a horizontal surface in the merchandise display fixture compartments, and a package support means for displaying a merchandise package, the package support means attachable to the display panel;
    placing the display panel in at least one display fixture compartment; and
    attaching the support leg to the at least one display fixture compartment.

17. The method of claim 16, wherein the display panel further comprises a width,
    the merchandise display adapter further comprising a support leg extension member having a width less than the width of the display panel and extending downwardly from and in the same plane as the vertical display panel,
    wherein the support leg extends transversely from the support leg extension member, and
    wherein the support leg extension member has a height greater than a height of a divider between the display fixture compartments.

18. The method of claim 17, wherein the support leg further comprises at least two spaced-apart support legs.

19. The method of claim 16, wherein the compartments are terraced in rows, the method further comprising placing the display panel in alternating rows of the compartments, wherein alternating rows of the compartments are adapted to display merchandise packages having varying sizes.

20. The method of claim 16, wherein the compartments are terraced in rows, the method further comprising placing the display panel in each row of the compartments, wherein each row of the compartments is adapted to display merchandise packages having varying sizes.

21. The method of claim 16, wherein the package support means further comprises a package support arm and a bracket attached to the package support arm for connecting the package support arm to the display panel.

22. The method of claim 21, wherein the display panel further comprises a J-shaped channel disposed from one side to the other side adjacent to the top of the display panel and wherein the bracket is adapted to slidingly fit into the J-shaped channel, the method further comprising adjusting the position of the package support arm laterally along the channel to adapt the merchandise display fixture to display merchandise packages having varying widths.

23. The method of claim 21, wherein the display panel further comprises a plurality of spaced-apart bracket-receiving slots adjacent the top of the display panel, and wherein the bracket further comprises a flange extending upwardly from the bracket and offset from the plane of the bracket in an "S-shaped" configuration, such that the flange is capable of being inserted upwardly into one of the plurality of bracket-receiving slots in the display panel.

24. The method of claim 21, wherein the package support arm is adapted to receive merchandise packages having a hanging means.

25. The method of claim 16, wherein the merchandise display fixture comprises a fixture for displaying hosiery and the merchandise package comprises a hosiery package.

* * * * *